(12) United States Patent
Lee

(10) Patent No.: US 11,922,062 B2
(45) Date of Patent: Mar. 5, 2024

(54) CONTROLLER AND OPERATING METHOD THEREOF

(71) Applicant: SK hynix Inc., Gyeonggi-do (KR)

(72) Inventor: Se Ho Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 117 days.

(21) Appl. No.: 17/461,451

(22) Filed: Aug. 30, 2021

(65) Prior Publication Data

US 2022/0300205 A1 Sep. 22, 2022

(30) Foreign Application Priority Data

Mar. 10, 2021 (KR) .......... 10-2021-0031640

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0604; G06F 3/0659; G06F 3/0679
See application file for complete search history.

(56) References Cited

U.S. PATENT DOCUMENTS

| 2006/0184949 A1* | 8/2006 | Craddock ........... G06F 11/3419 719/314 |
| 2012/0047319 A1* | 2/2012 | Yoon ..................... G06F 3/0653 711/E12.008 |
| 2017/0168986 A1* | 6/2017 | Sajeepa ............. G06F 15/17331 |
| 2019/0087332 A1* | 3/2019 | Jun ........................ G06F 3/0679 |
| 2020/0210349 A1* | 7/2020 | Dolev ................... G06F 12/126 |
| 2021/0117099 A1* | 4/2021 | Faibish ................ G06F 3/0659 |

FOREIGN PATENT DOCUMENTS

| KR | 1020160056723 A | 5/2016 |
| KR | 1020200073592 A | 6/2020 |

OTHER PUBLICATIONS

Lee, Junghee; Kim, Youngjae; Shipman, Galen M; Oral, Sarp; and Kim, Jongman, Preemptible I/O Scheduling of Garbage Collection for Solid State Drives, Feb. 2, 2013, IEEE: Transactions on Computer Aided Design of Integrated Circuits and Systems, vol. 32, No. 2, 247-260 (Year: 2013).*

* cited by examiner

*Primary Examiner* — Francisco A Grullon
(74) *Attorney, Agent, or Firm* — IP & T GROUP LLP

(57) ABSTRACT

Disclosed are a controller that controls a memory device, and an operating method of the controller. The controller may include a host interface suitable for fetching a write command received from a host; and a processor suitable for controlling a write operation of the memory device in response to the fetched write command, wherein, when a workload of a background operation of the processor is greater than a workload of a host write operation, the host interface is further suitable for: determining a delay amount of time and providing the host with a completion response to the write command after delaying the completion response by the delay amount of time.

16 Claims, 9 Drawing Sheets

CONTROLLER AND OPERATING METHOD THEREOF

CROSS-REFERENCE TO RELATED APPLICATION(S)

The present application claims priority under 35 U.S.C. § 119(a) to Korean Patent Application No. 10-2021-0031640, filed on Mar. 10, 2021, the disclosure of which is incorporated herein by reference in its entirety.

BACKGROUND

1. Field

Various embodiments of the present disclosure relate to a controller and an operating method thereof.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments of the present disclosure are directed to a controller that may improve the quality of service of a memory system with respect to a request of a host, and an operating method of the controller.

In accordance with an embodiment of the present disclosure, a controller that controls a memory device may include: a host interface suitable for fetching a write command received from a host; and a processor suitable for controlling a write operation of the memory device in response to the fetched write command, wherein, when a workload of a background operation of the processor is greater than a workload of a host write operation, the host interface is further suitable for: determining a delay amount of time and providing the host with a completion response to the write command after delaying the completion response by the delay amount of time.

The host interface may include: a host interface layer (HIL) core suitable for determining the delay amount and generating the completion response; and a command state scheduler suitable for delaying the completion response by the delay amount of time, and then providing the host with the delayed completion response.

The HIL core may be further suitable for: receiving write data associated with the write command from the host, and outputting the completion response to the command state scheduler.

The host interface may determine the delay amount of time based on a free buffer size and an estimated-required buffer size.

The host interface interface may be further suitable for determining the estimated-required buffer size based on a number of commands received from the host but unfetched, a ratio of write commands among recently fetched commands and a data size of the fetched write command.

The controller may further include a host write buffer, wherein the host interface is further suitable for determining the free buffer size based on a size of the host write buffer, an allocated buffer size and the estimated-required buffer size.

The host interface may determine the delay amount of time as "0" when the free buffer size is equal to or greater than a threshold buffer size.

The controller may further include a host write buffer, wherein the threshold buffer size is determined according to a size of the host write buffer and a data size that can be simultaneously programmed into the memory device.

The processor may be further suitable for setting a background flag by comparing the workload of the background operation with the workload of the host write operation, and wherein the host interface is further suitable for determining whether the workload of the background operation is greater than the workload of the host write operation, by referring to the background flag.

The processor may set the background flag by comparing a number of valid pages, which are copied from a victim block to a target block during a garbage collection operation, with a number of pages stored in the memory device in response to the write command of the host during the garbage collection operation.

In accordance with an embodiment of the present disclosure, an operating method of a controller that controls a memory device may include: fetching a write command received from a host; controlling a write operation of the memory device in response to the fetched write command; determining a delay amount of time when a workload of a background operation of the controller is greater than a workload of a host write operation; and providing the host with a completion response to the write command after delaying the completion response by the delay amount of time.

The operating method may further include receiving write data associated with the write command from the host, wherein the providing is performed after the receiving of the write data.

The operating method may further include determining the delay amount of time based on a free buffer size and an estimated-required buffer size.

The operating method may further include determining the estimated-required buffer size based on a number of commands received from the host but unfetched, a ratio of the write commands among recently fetched commands and a data size of the fetched write command.

The operating method may further include determining the free buffer size based on a size of a host write buffer included in the controller, an allocated buffer size and the estimated-required buffer size.

The delay amount of time may be determined as "0" when the free buffer size is equal to or greater than a threshold buffer size.

The threshold buffer size may be determined according to a size of a host write buffer included in the controller and a data size that can be simultaneously programmed into the memory device.

The operating method may further include: setting a background flag by comparing the workload of the background operation with the workload of the host write operation; and determining whether the workload of the background operation is greater than the workload of the host write operation, by referring to the background flag.

The background flag may be set by comparing a number of valid pages, which are copied from a victim block to a target block during a garbage collection operation, with a number of pages stored in the memory device in response to the write command of the host during the garbage collection operation.

In accordance with an embodiment of the present disclosure, an operating method of a controller may include: responding to a first write command while buffering first write data into a buffer and controlling a memory device to perform, as well as a background operation, a write operation with second write data buffered in the buffer; and delaying, when a background operation workload is greater than a write operation workload and an available capacity of the buffer is smaller than a threshold capacity, the responding by a delay amount while controlling the memory device to perform at least the background operation during the delay amount, wherein the available capacity is calculated by equation A:

(Free buffer size)=(host write buffer size)−(allocated buffer size)+(estimated required buffer size)    [Equation A]

where "Free buffer size" is the available capacity, "host write buffer size" is a total capacity for write data within the buffer, "allocated buffer size" is an allocated capacity of the buffer and "estimated-required buffer size" is an estimated-required capacity of the buffer calculated by equation B:

(Estimated required buffer size)=(# of unfetched CMD)×(fetched write CMD ratio)×(data size of fetched write CMD)    [Equation B]

where "# of unfetched CMD" is a number of commands to be queued, "fetched write CMD ratio" is a ratio of queued write commands to a predetermined number of queued commands, and "data size of fetched write CMD" is a size of write data of one of the queued write commands, and wherein the delay amount is calculated by equation C:

$$(\text{Delay}) = \frac{(\text{threshold buffer size}) - (\text{free buffer size})}{(\text{threshold buffer size})} \times (\text{estimated required buffer size}) \times C \quad [\text{Equation C}]$$

where "delay" is the delay amount, "threshold buffer size" is the threshold capacity, and "C" is a predetermined constant.

DETAILED DESCRIPTION

Hereinafter, various embodiments of the present disclosure will be described with reference to the accompanying drawings.

However, the present disclosure is not limited to the embodiments disclosed below, but may be implemented in various other forms. The disclosed embodiments are provided to make the present disclosure complete and to enable those skilled in the art to practice the present disclosure.

Figure 1:
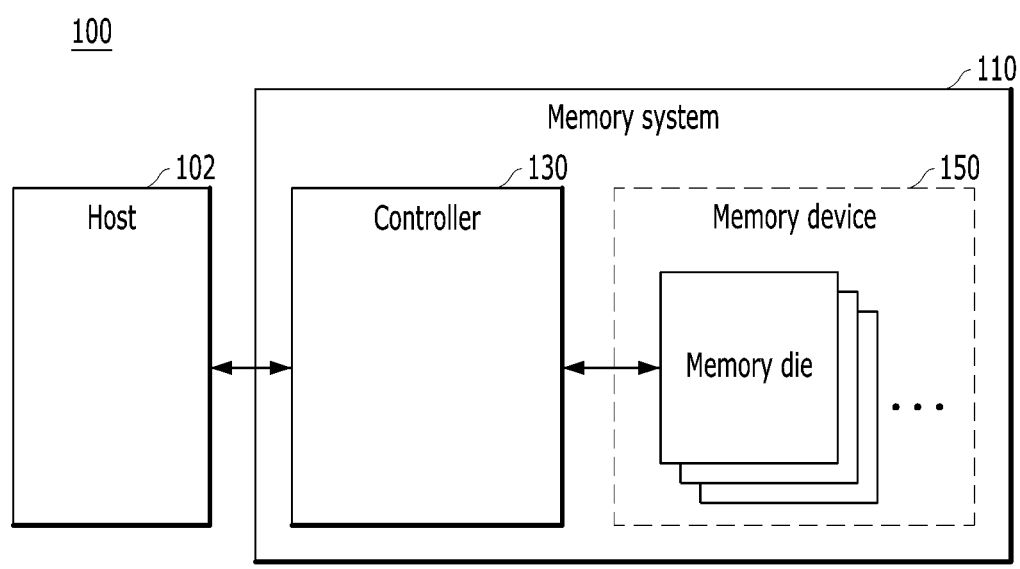
FIG. 1 is a diagram schematically illustrating an example of a data processing system including a memory system in accordance with an embodiment of the present disclosure.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use, purpose, and usage of a user. For example, the OS may be divided into a general OS and a mobile OS, depending on the mobility of the host 102. The general OS may be divided into a personal OS and an enterprise OS, depending on the environment of a user.

For example, the personal OS configured to support a function of providing a service to general users may include Windows and Chrome, and the enterprise OS configured to secure and support high performance may include Windows server, Linux, and Unix. Furthermore, the mobile OS configured to support a function of providing a mobile service to users and a power saving function of a system may include Android, iOS, and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 may include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the like. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phasechange RAM (PRAM), a magneto-resistive RAM (MRAM), resistive RAM (RRAM or ReRAM) and a flash memory. The flash memory may have a 3-dimensional (3D) stack structure.

The memory system 110 may communicate with the host 102 by using a command queue interface that supports a protocol such as NVMe. The command queue interface may support interfacing between the host 102 and the memory system 110, based on a queue pair including a submission queue for inputting a requested command and a completion queue for recording a processing result of the command. The interacting between the host 102 and the memory system 110 will be described in detail with reference to FIG. 2.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a program operation, and provide data stored therein to the host 102 through a read operation. The memory device 150 may include a plurality of memory blocks 152, 154, 156 . . . each of which may include a plurality of pages, and each of the pages may include a plurality of memory cells coupled to a word line. In an embodiment, the memory device 150 may be a flash memory. The flash memory may have a 3-dimensional (3D) stack structure.

The memory device 150 may include a flash memory device. The flash memory device may store data in a memory cell array including memory cell transistors. The flash memory device may have a hierarchical structure of memory die, plane, memory block and page. One memory die may receive one command at a time. The flash memory may include a plurality of memory dies. One memory die may include a plurality of planes, and the plurality of planes may process commands received by the memory die in parallel. Each of the planes may include a plurality of memory blocks. The memory block may correspond to the minimum unit of an erase operation. One memory block may include a plurality of pages. The page may correspond to the minimum unit of a write operation.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

When the host 102 provides the controller 130 with a command, the controller 130 may fetch the command and queue the fetched command into an internal command queue. Upon completely processing the fetched command, the controller 130 may provide the host 102 with a completion response, and remove the queued command from the command queue. For example, the controller 130 may fetch a write command received from the host 102. The controller 130 may acquire write data from the host 102 in response to the fetched write command, and buffer the write data in a buffer included in the memory system 110. Upon completely buffering the write data, the controller 130 may provide the host 102 with a completion response.

The controller 130 may still perform an operation on the command even after providing the host 102 with the completion response to the command. For example, the controller 130 may control the memory device 150 to program the buffered write data. The controller 130 may perform a background operation for managing the memory system 110 as well as a foreground operation in response to the command from the host 102.

When receiving a completion response from the controller 130, the host 102 may provide the controller 130 with a command for a next operation. For example, the number of commands that can be queued in the command queue may be limited by a predetermined queue depth. When receiving the completion response from the controller 130, the host 102 may provide the controller 130 with a next command that could not be provided to the controller 130 due to the command queue full of commands.

When the host 102 provides the controller 130 with a command, the controller 130 is required to provide the host 102 with a completion response to the command within a time limit in order to satisfy the quality of service required by the host 102. When a next command is received from the host 102 in a situation where an internal workload of the controller 130 is heavy, the processing of the command may be delayed, and it may be difficult to provide the host 102 with the completion response within a predetermined processing time.

According to an embodiment, the controller 130 may perform a write throttling operation for delaying a completion response to a command from the host 102, according to the internal workload. Specifically, the controller 130 may delay the completion response when the workload of the background operation is greater than the workload of the foreground operation. For example, when the time limit is 1100 us and the controller 130 completes the processing of a certain command within 600 us, the controller 130 may satisfy the quality of service for the command even when delaying the completion response within 500 us.

When the completion response is delayed, it may be also delayed that the host 102 provides the controller 130 with a next command. The controller 130 may reduce the internal workload by performing the foreground operation and the background operation without receiving the next command for a delayed time. When the controller 130 receives the next command after the internal workload is reduced, delay in processing the corresponding command may be prevented. Accordingly, the controller 130 may provide the host 102 with a completion response to the next command within the time limit, and satisfy the quality of service required by the host 102.

The controller 130 according to the present embodiment will be described in detail with reference to FIGS. 2 to 9.

Figure 2:
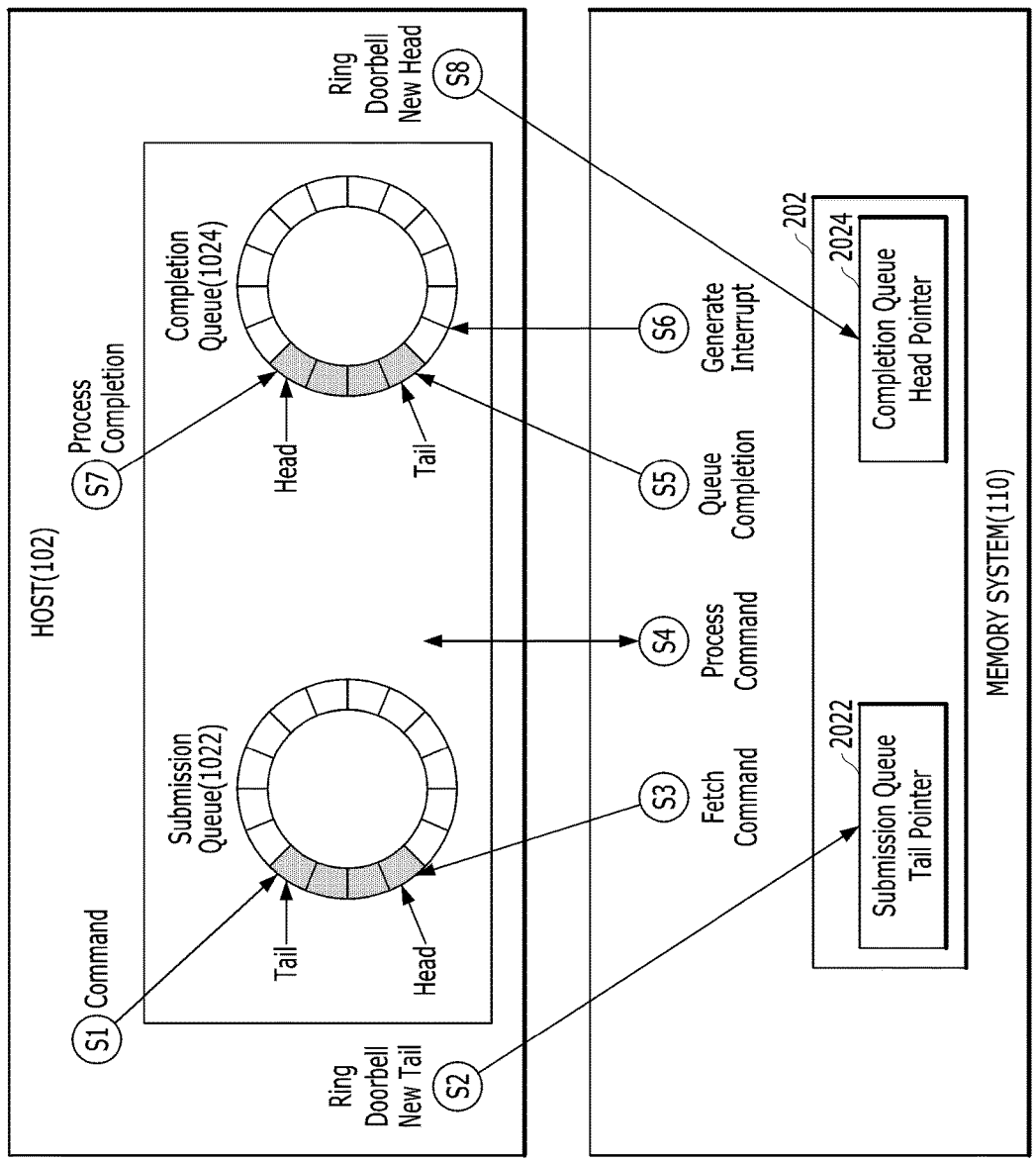
FIG. 2 is a diagram illustrating a command queue interface operation in accordance with an embodiment of the present disclosure.

FIG. 2 is a diagram for describing the command queue interface operation in accordance with an embodiment of the present disclosure.

The host 102 may generate a queue pair including a submission queue 1022 and a completion queue 1024. When a plurality of cores exist in the host 102, the queue pair of the submission queue 1022 and the completion queue 1024 may be generated to correspond to one of the plurality of cores. In accordance with an embodiment, the queue pair may be stored in a memory of the host 102.

The memory system 110 may include a doorbell register 202 in order to perform the command queue interface operation. The memory system 110 communicates with the host 102 using a doorbell-based host interface which allows the host 102 putting descriptors on a memory ring for the memory system and issuing a pointer update write request to the memory system 110. The pointer update write request is referred to a "doorbell."

The doorbell register 202 may be a register for controlling the queue pair generated by the host 102. FIG. 2 illustrates one doorbell register 202 as an example, but when a plurality of cores exist in the host 102, the same number of doorbell registers 202 as the number of the cores may be included in the memory system 110. The doorbell register 202 may store a submission queue tail pointer 2022 indicating a tail of the submission queue 1022 and a completion queue head pointer 2024 indicating a head of the completion queue 1024. The memory system 110 may perform the command queue interface operation with the host 102 by accessing the submission queue 1022 and the completion queue 1024 with reference to the doorbell register 202.

In operation S1, the host 102 may queue a command in the submission queue 1022 in order to request the memory system 110 to perform a command. In operation S2, the host 102 may update the submission queue tail pointer 2022 and provide the updated submission queue tail pointer 2022 to the memory system 110. The memory system 110 may store the updated submission queue tail pointer 2022 in the doorbell register 202.

In operation S3, the memory system 110 may fetch the command from the submission queue 1022. In operation S4, the memory system 110 may process the fetched command.

In operation S5, after the command has processed, the memory system 110 may record the completion of the command processing in the completion queue 1024. For example, the memory system 110 may write a completion queue entry in the completion queue 1024. In such a case, the completion queue head pointer 2024 may increase. In operation S6, the memory system 110 may generate an interrupt signal.

In operation S7, the host 102 may complete the command. In operation S8, the host 102 may provide the updated completion queue head pointer 2024 to the memory system 110. For example, the memory system 110 may store the updated completion queue head pointer 2024 in the doorbell register 202.

Figure 3:
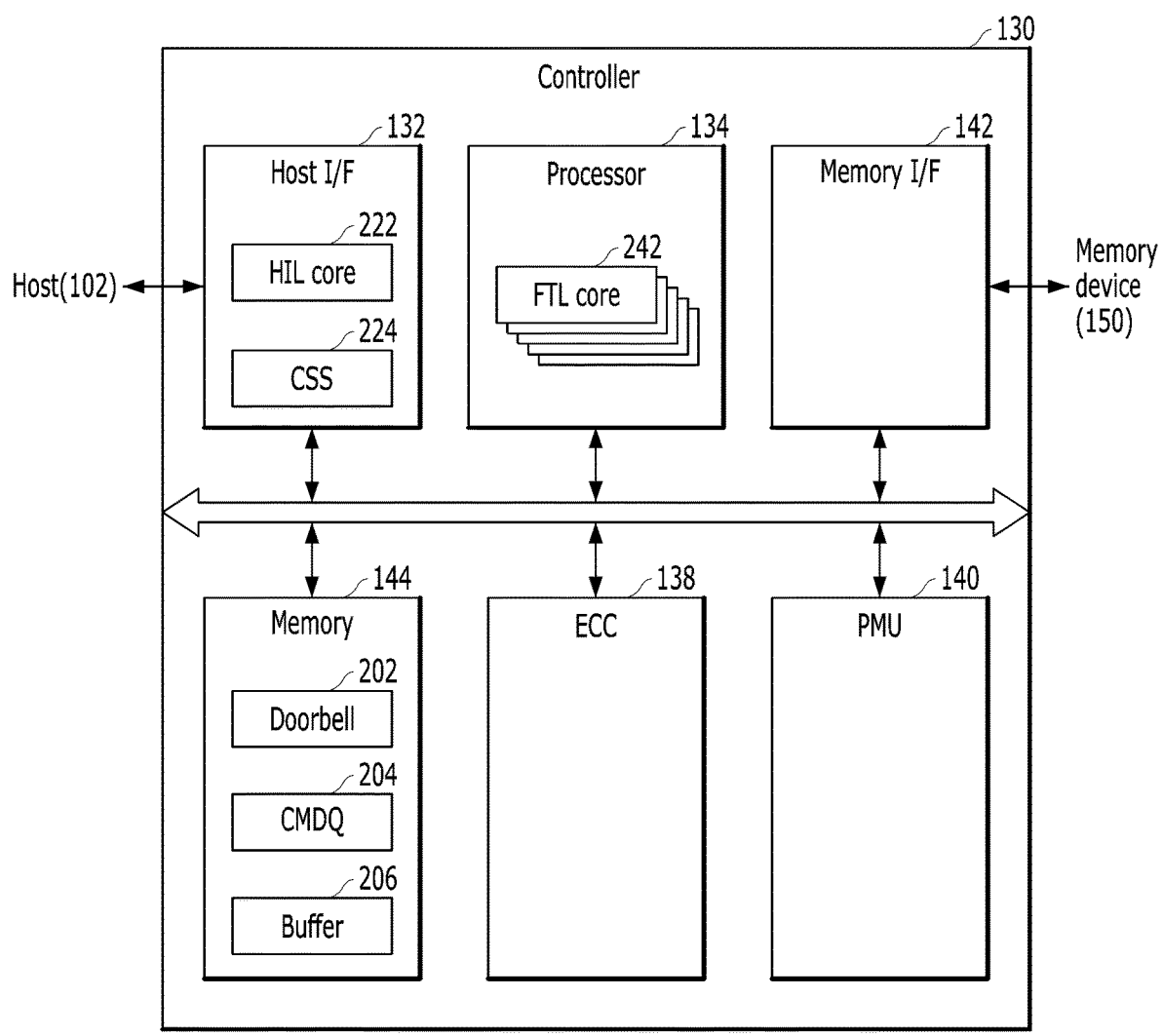
FIG. 3 is a detailed diagram illustrating a controller described with reference to FIG. 1 in accordance with an embodiment of the present disclosure.

FIG. 3 is a detailed diagram illustrating the controller 130 described with reference to FIG. 1 in accordance with an embodiment of the present disclosure.

The controller 130 may include a Host interface (I/F) 132, a processor 134, an error correction code (ECC) component 138, a Power Management Unit (PMU) 140, a memory I/F 142, and a memory 144 all operatively coupled via an internal bus.

The Host I/F 132 may be configured to process a command and data of the host 102, and may communicate with the host 102 through one or more of various communication standards or interfaces such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The Host I/F 132 may include a host interface layer (HIL) core 222 and a command state scheduler (CSS) 224. The HIL core 222 may drive firmware called a HIL, and support the command queue interfacing described with reference to FIG. 2. The command state scheduler 224 may selectively delay a completion response to a command under the control of the HIL core 222, and provide the host 102 with the completion response.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory I/F 142 may be driven through firmware referred to as a flash interface layer (FIL) in order to exchange data with the memory device 150.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

The processor 134 may drive the FTL and perform a foreground operation corresponding to a request received from the host 102. For example, the processor 134 may control a write operation of the memory device 150 in response to a write request from the host and control a read operation of the memory device 150 in response to a read request from the host.

Also, the controller 130 may perform a background operation onto the memory device 150 through the processor 134, which is realized as a microprocessor or a CPU. For example, the background operation performed onto the memory device 150 may include a garbage collection (GC) operation, a wear-leveling (WL) operation, a map flush operation, or a bad block management operation.

The processor 134 may include one or more FTL cores 242. When the processor 134 includes a plurality of FTL cores 242, each of the FTL cores 242 may drive the FTL, and control allocated memory dies. The host interface 132 may distribute commands received from the host 102, and provide each of the FTL cores 242 with the distributed commands, thereby improving parallel processing performance. For example, the host interface 132 may distribute the commands based on a logical address included in the commands, for example, a logical block address (LBA). Each of the FTL cores 242 may control a parallel operation on the memory dies by interleaving the commands to be provided to the allocated memory dies.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 illustrates the memory 144 disposed within the controller 130. In an embodiment, the memory 144 may be implemented as an external volatile memory device, and the memory 144 may have a memory interface for inputting and outputting data to and from the controller 130.

The memory 144 may include a doorbell register 202, a command queue 204 and a buffer 206.

The doorbell register 202 may be referenced to perform the command queue interface operation with the host 102 as described with reference to FIG. 2. For example, the host interface 132 may detect that a command is received from the host 102, by referring to the doorbell register 202, and fetch the received command.

The command queue 204 may queue the command fetched by the host interface 132. The processor 134 may obtain and process the queued command from the command queue 204. When the processor 134 obtains the queued command, the host interface 132 may provide the host 102 with a completion response to the command.

The buffer 206 may store data for programming in the memory device 150 or data read from the memory device 150. Depending on the implementation, the buffer 206 may include a host write buffer that stores write data received from the host 102, a host read buffer that stores read data requested from the host 102 and a background buffer that stores data for a background operation.

The ECC component 138 may detect and correct an error contained in the data read from the memory device 150. The ECC component 138 may perform an error correction decoding process to the data read from the memory device 150 through an ECC value used during an ECC encoding process. According to a result of the error correction decoding process, the ECC component 138 may output a signal, for example, an error correction success/fail signal. When the number of error bits is more than a threshold value of correctable error bits, the ECC component 138 may not correct the error bits, and may output an error correction fail signal.

The power management unit 140 may provide and manage power of the controller 130. The power management unit 140 may include a capacitor that provides emergency power so that the memory system 110 can normally terminate when sudden power off occurs. For example, when the sudden power off occurs, the controller 130 may use the emergency power to store write data of the buffer 206 in the memory device 150 and terminate the memory system 110.

Figure 4:
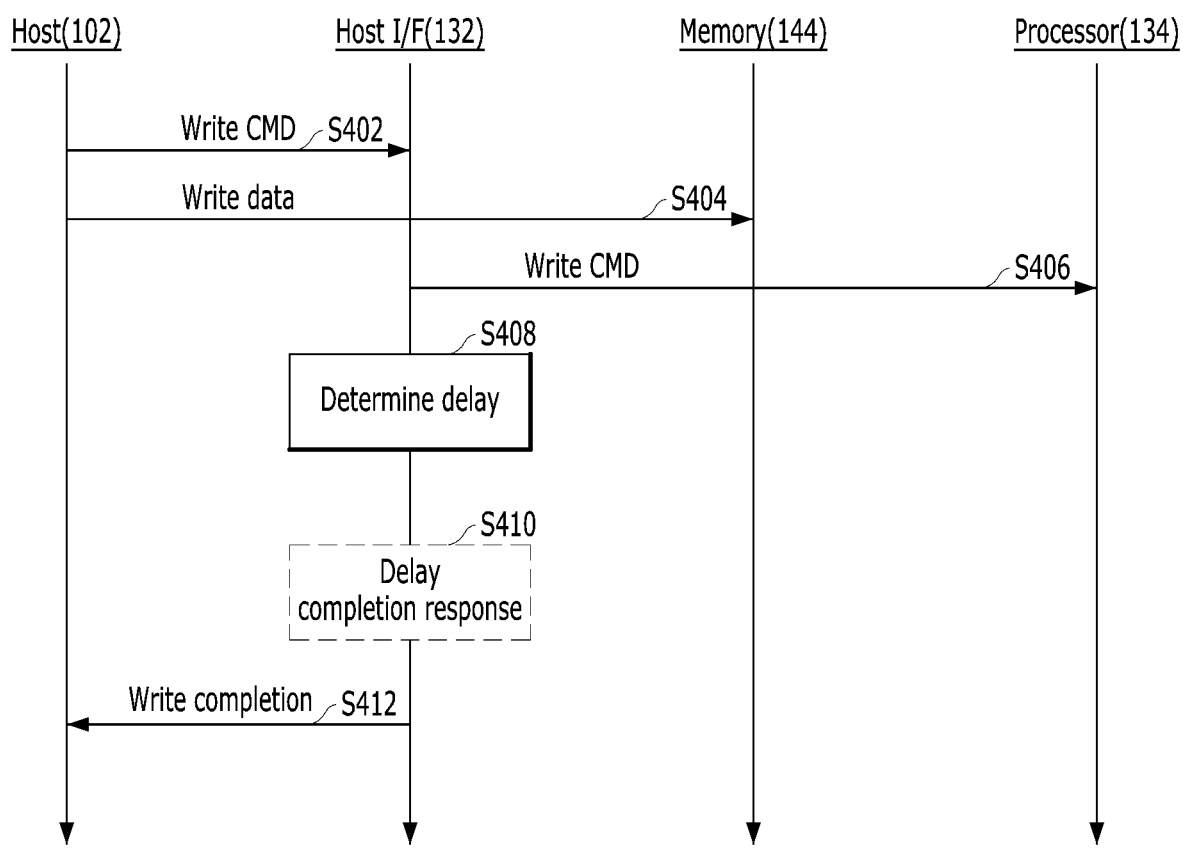
FIG. 4 is a diagram illustrating an operation of the controller in accordance with an embodiment of the present disclosure.

FIG. 4 is a diagram illustrating an operation of the controller 130 in accordance with an embodiment of the present disclosure.

In operation S402, the host 102 may provide the host interface 132 with a write command. The host interface 132 may fetch the command received from the host 102.

In operation S404, the host interface 132 may receive write data corresponding to the write command from the host 102, and buffer the write data in the memory 144.

In operation S406, the host interface 132 may provide the processor 134 with the write command. For example, the host interface 132 may queue the fetched write command to the command queue 204 so that the processor 134 may obtain the fetched write command.

In operation S408, the HIL core 222 of the host interface 132 may determine whether to delay a completion response to the write command, based on the workloads of the foreground and background operations of the processor 134. When the HIL core 222 determines to delay the completion response, the HIL core 222 may determine a delay amount of time for delaying the completion response based on a free buffer size of the buffer 206 and a buffer size required to process the write command. A method of determining whether to delay the completion response and a method of determining the delay amount of time by the HIL core 222 will be described in detail with reference to FIG. 5.

When the HIL core 222 determines to delay the completion response, the HIL core 222 may provide the command state scheduler 224 with the completion response and control the command state scheduler 224 to delay the completion response by the determined delay amount of time, in operation S410.

When the determined delay amount of time elapses, the command state scheduler 224 may provide the host 102 with the completion response in operation S412.

FIGS. 5 to 9 are detailed diagrams illustrating an operation of the controller 130 in accordance with an embodiment of the present disclosure.

Figure 5:
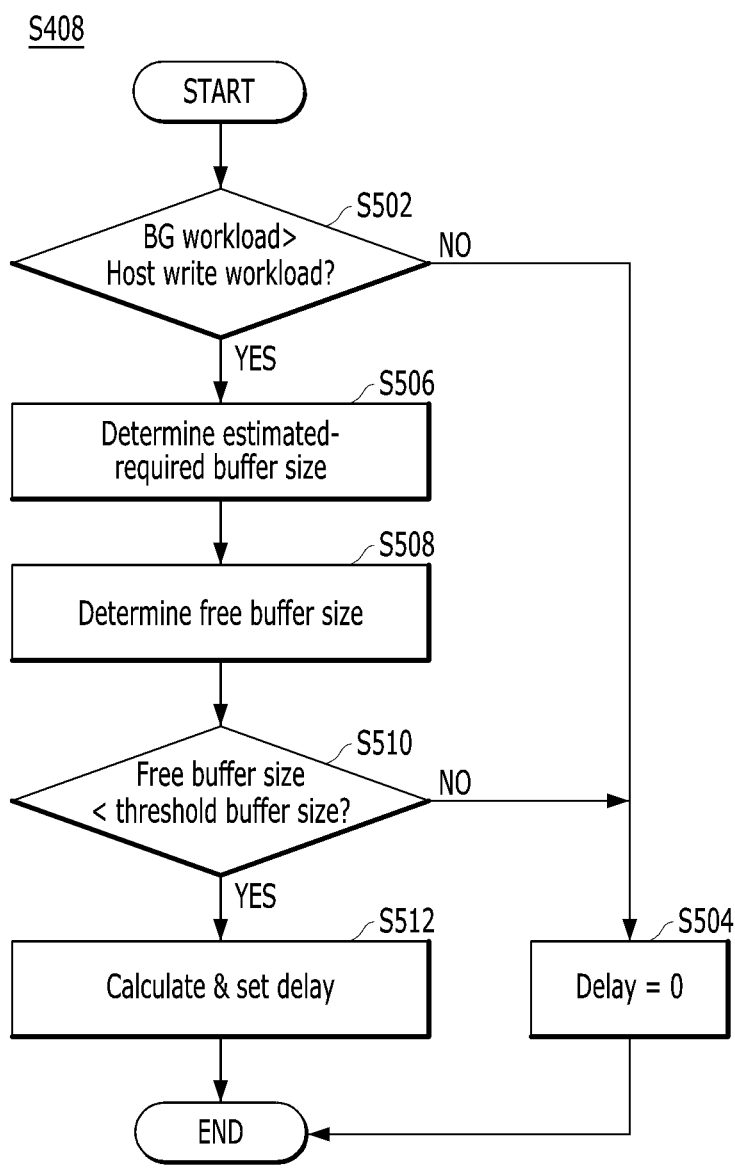
FIGS. 5 to 9 are detailed diagrams illustrating an operation of the controller in accordance with an embodiment of the present disclosure.

FIG. 5 represents an operation included in operation S408 of determining whether to delay the completion response and the delay amount of time. Operation S408 may include operations S502, S504, S506, S508, S510 and S512.

In operation S502, the HIL core 222 may determine whether the workload of the background operation is greater than that of the host write operation.

For example, the FTL core 242 may determine whether the workload of the background operation is greater than that of the host write operation and set a background flag according to the determination. With reference to the background flag, the HIL core 222 may determine whether the workload of the background operation is greater than that of the host write operation. As described with reference to FIG. 3, the processor 134 may include a plurality of FTL cores 242. The plurality of FTL cores 242 may independently perform the foreground and background operations associated with different logical addresses. Each of the plurality of FTL cores 242 may set the background flag. The HIL core 222 may determine whether to delay a completion response to a corresponding write command, by referring to the background flag of the FTL core 242 corresponding to a logical address of the write command. An example of an operation in which the FTL core 242 sets the background flag will be described in detail with reference to FIG. 6.

When the workload of the background operation is equal to or less than that of the host write operation (that is, "NO" in operation S502), the HIL core 222 may determine the delay amount of time as "0" in operation S504.

When the workload of the background operation is greater than that of the host write operation (that is, "YES" in operation S502), the HIL core 222 may determine an estimated-required buffer size in operation S506. The estimated-required buffer size may refer to a buffer size that is estimated to be required in order to process write commands, which are provided from the host 102 to the controller 130 but not yet fetched. The HIL core 222 may determine a longer delay amount of time of a currently processed write command as the estimated-required buffer size increases. An example of a method of determining the estimated-required buffer size will be described in detail with reference to FIG. 7.

In operation S508, the HIL core 222 may determine a free buffer size capable of buffering write data received from the host 102. An example of a method of determining the free buffer size will be described in detail with reference to FIG. 8.

In operation S510, the HIL core 222 may determine whether the free buffer size is smaller than a threshold buffer size.

The threshold buffer size may be predetermined. As an example, the threshold buffer size may be determined to be 65% to 75% of the host write buffer size. As another example, the threshold buffer size may be determined based on the host write buffer size, a stripe size and the number of FTL cores 242. The stripe size, which is a size of data that can be controlled so that the FTL cores 242 are programmed at the same time, may be determined based on the number of planes on which parallel operations are performed and the number of bits that can be stored in a memory cell. Equation 1 below is an example of an equation for determining the threshold buffer size.

(Threshold buffer size)=(host write buffer size)−
(stripe size)×(# of FTL cores)×3  [Equation 1]

In Equation 1, "threshold buffer size" may refer to the threshold buffer size, "host write buffer size" may refer to the host write buffer size, "stripe size" may refer to the stripe size, and "# of FTL cores" may refer to the number of FTL cores 242.

When the free buffer size is equal to or greater than the threshold buffer size (that is, "NO" in operation S510), the HIL core 222 may determine that the free buffer size is sufficient and determine the delay amount of time as "0", in operation S504.

When the free buffer size is smaller than the threshold buffer size (that is, "YES" in operation S510), the HIL core 222 may calculate the delay amount of time and set the delay amount of time of the command state scheduler 224, in operation S512. The delay amount of time may be determined based on the estimated-required buffer size and the free buffer size. An example of a method of calculating the delay amount of time will be described in detail with reference to FIG. 9.

Figure 6:
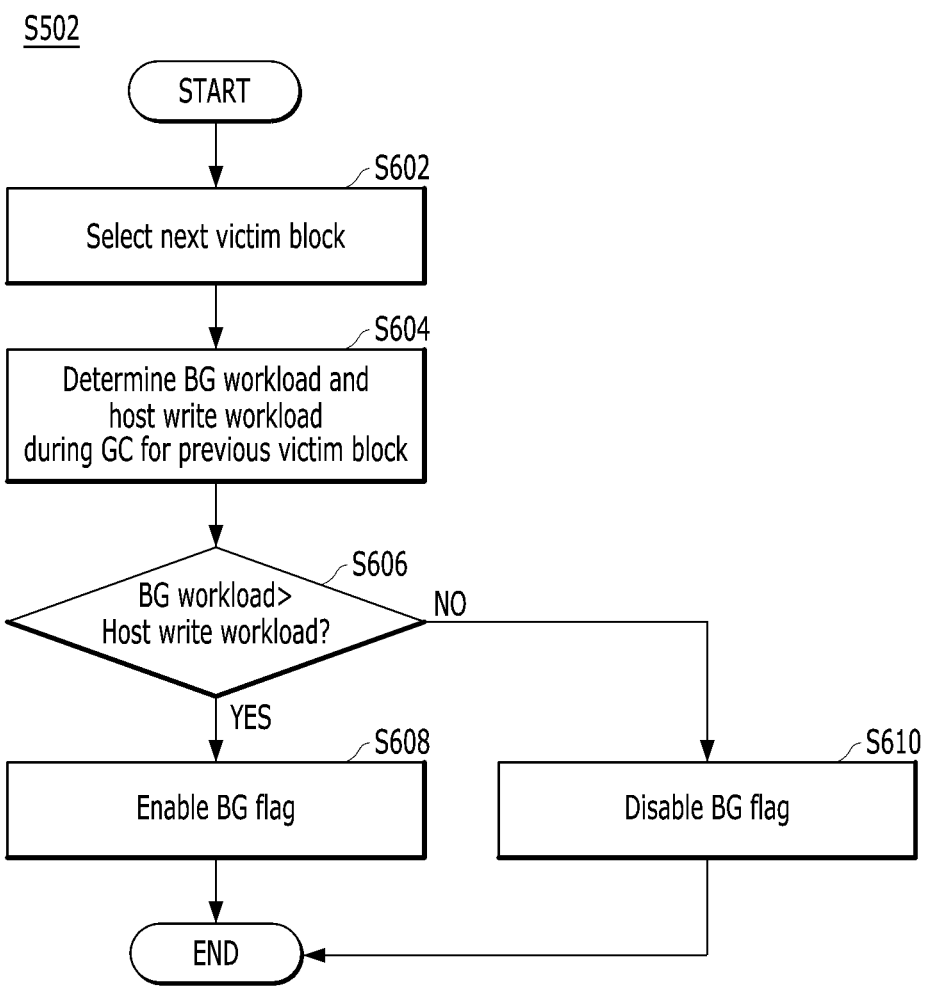

FIG. 6 represents an example of an operation in which the FTL core 242 sets the background flag in accordance with an embodiment of the present disclosure.

The FTL core 242 may perform a garbage collection operation by selecting, as a victim block, any of the memory blocks in which data are stored, loading valid data of the selected victim block into the buffer 206, and storing the loaded valid data in a target block.

After completely performing the garbage collection operation for a previous victim block, the FTL core 242 may select a next victim block in operation S602.

In operation S604, the FTL core 242 may determine the workload of the background operation and that of the host write operation during the garbage collection operation for the previous victim block. For example, a workload of the garbage collection operation may be determined as that of the background operation. The workload of the garbage collection operation may be determined as the number of valid pages copied from the previous victim block to the target block. The workload of the host write operation may be determined as the number of pages stored in the memory device 150 in response to the host write command during the garbage collection operation for the previous victim block.

In operation S606, the FTL core 242 may determine whether the workload of the background operation is greater than that of the host write operation.

When the workload of the background operation is greater than that of the host write operation (that is, "YES" in operation S606), the FTL core 242 may enable the background flag in operation S608.

When the workload of the background operation is equal to or less than that of the host write operation (that is, "NO" in operation S606), the FTL core 242 may disable the background flag in operation S610.

FIG. 6 illustrates a method of setting the background flag by taking an example of updating the background flag whenever the FTL core 242 completely performs the garbage collection operation for the previous victim block and selects the next victim block, in accordance with an embodiment of the present disclosure. However, a period of updating the background flag is not limited to the example described with reference to FIG. 6.

Figure 7:
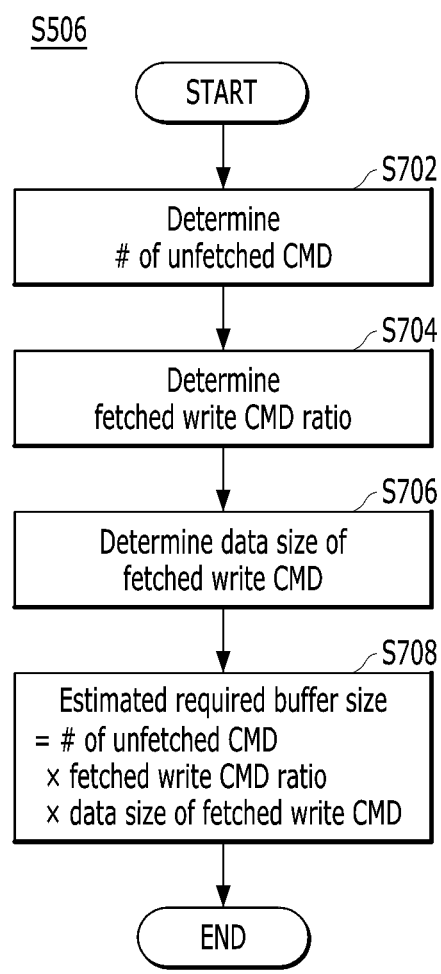

FIG. 7 is a detailed diagram illustrating an example of a method of determining the estimated-required buffer size by the HIL core 222, in accordance with an embodiment of the present disclosure.

Operation S506 may include operations S702, S704, S706 and S708.

In operation S702, the HIL core 222 may determine the number of unfetched commands. For example, the HIL core 222 may determine the number of unfetched commands based on positions of the tail and head of the submission queue 1022. The buffer required for the unfetched commands may be determined based on whether the commands are write commands, and the size of data associated with the commands. However, it is difficult for the HIL core 222 to accurately know whether a corresponding command is a write command, and the size of data related to the command until the command is fetched. Accordingly, the HIL core 222 may estimate the number of unfetched write commands and the size of write data associated with the unfetched write commands based on a ratio of previously fetched write commands and the data size of the already fetched write commands.

In operation S704, the HIL core 222 may determine the ratio of previously fetched write commands. The ratio of previously fetched write commands may refer to a ratio of the write commands among a predetermined number of previously fetched commands. For example, the HIL core 222 may count the total number of fetched commands and the number of write commands in the total number whenever commands are fetched, and determine the ratio of fetched write commands based on the counted total number of commands and the counted number of write commands whenever the predetermined number of commands are fetched.

In operation S706, the HIL core 222 may determine the data size of the recently fetched write command. Depending on the implementation, the data size may be indicated as the number of 4 KB data chunks.

In operation S708, the HIL core 222 may determine the estimated-required buffer size based on the number of unfetched commands, the ratio of fetched write commands and the data size of the recently fetched command. Equation 2 below is an example of an equation for determining the estimated-required buffer size.

$$\text{(estimated required buffer size)}=32 \cdot (\text{\# of unfetched CMD}) \times (\text{fetched write CMD ratio}) \times (\text{data size of fetched write CMD}) \quad \text{[Equation 2]}$$

In Equation 2, "estimated-required buffer size" may refer to the estimated-required buffer size, "# of unfetched CMD" may refer to the number of unfetched commands, "fetched write CMD ratio" may refer to the ratio of fetched write commands, and "data size of fetched write CMD" may refer to the data size of the fetched write command.

Figure 8:
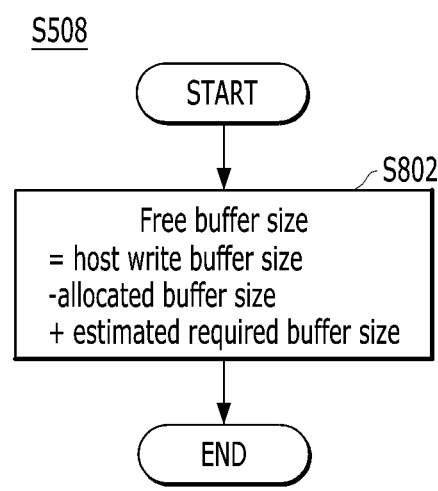

FIG. 8 is a detailed diagram illustrating an example of a method of determining the free buffer size by the HIL core 222, in accordance with an embodiment of the present disclosure.

In operation S802, the HIL core 222 may determine the free buffer size based on the host write buffer size, an allocated buffer size and the estimated-required buffer size.

The HIL core 222 may allocate the host write buffer to buffer data associated with the fetched write command. In addition, the HIL core 222 may pre-allocate the host write buffer, the amount of the pre-allocation corresponding to the estimated-required buffer size, for a write command that has not yet been fetched. Accordingly, the HIL core 222 may determine the free buffer size based on the host write buffer size, the allocated buffer size and the estimated-required buffer size. Equation 3 below is an example of an equation for determining the free buffer size.

$$\text{(Free buffer size)}=\text{(host write buffer size)}-\text{(allocated buffer size)}+\text{(estimated required buffer size)} \quad \text{[Equation 3]}$$

In Equation 3, "free buffer size" may refer to the free buffer size, "host write buffer size" may refer to the host write buffer size, "allocated buffer size" may refer to the allocated buffer size, and "estimated-required buffer size" may refer to the estimated-required buffer size.

Figure 9:
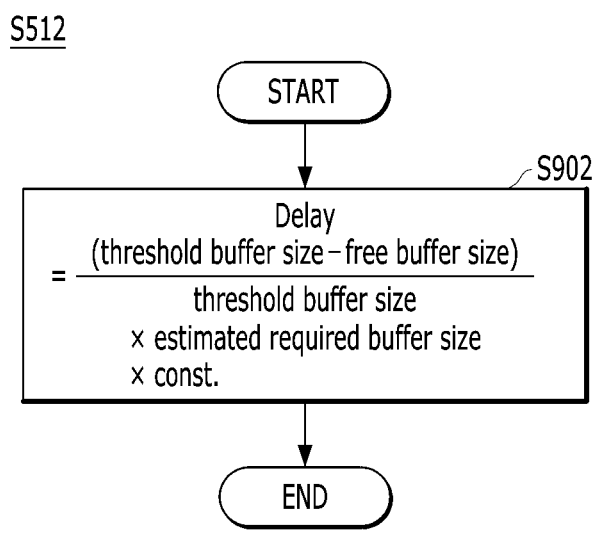

FIG. 9 is a detailed diagram illustrating an example of a method of determining the delay amount of time by the HIL core 222, in accordance with an embodiment of the present disclosure.

In operation S902, the HIL core 222 may determine the delay amount of time based on the free buffer size and the estimated-required buffer size. Equation 4 below is an example of an equation for determining the delay amount of time.

$$\text{(Delay)} = \frac{\text{(threshold buffer size)} - \text{(free buffer size)}}{\text{(threshold buffer size)}} \times \text{(estimated required buffer size)} \times C \quad \text{[Equation 4]}$$

In Equation 4, "delay" may refer to the delay amount of time, "threshold buffer size" may refer to the threshold buffer size, "free buffer size" may refer to the free buffer size, "estimated-required buffer size" may refer to the estimated-required buffer size, and "C" may refer to a predetermined constant.

Referring to Equation 4, the predetermined constant may be multiplied to adjust the delay amount of time, and the constant may be determined based on a time that may be taken when the memory system 110 processes a write command in a case where the host 102 determines a queue depth of the command queue 204 is "1" and provides the write command.

According to the present embodiment, when the processing of commands to be received from the host 102 is expected to be delayed, the controller 130 may delay a completion response to the processed write command. Examples of a case where the processing of commands to be received is expected to be delayed may include a case where processing resources for processing a host write command become insufficient due to a background operation, a case where the free buffer size for host write data in the buffer 206 becomes insufficient or a case where a large amount of buffers is expected to be required due to write commands to be fetched. When delaying the completion response to the processed write command, the controller 130 may determine the delay amount of time based on the estimated-required buffer size and the free buffer size. The controller 130 may secure the processing resources for processing the host write command by performing an internal operation while a completion response to a currently processed write command is delayed, and receive a write command from the host 102 after securing a free buffer. Accordingly, the controller 130 may prevent a delay in processing commands to be received, and provide the host 102 with the required quality of service.

According to the embodiments of the present disclosure, a controller and an operating method thereof may improve the quality of service of a memory system with respect to a request of a host.

Although a controller and an operating method thereof have been described with respect to specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, but these also do not depart from the scope of the present disclosure. In addition, those skilled in the art may easily change or modify the disclosed embodiments based on the present specification, and it is apparent that such changes or modifications also fall within the scope of the present disclosure.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. A controller that controls a memory device, the controller comprising:
   a host interface suitable for fetching a write command received from a host;
   a buffer suitable for storing write data associated with the write command; and
   a processor suitable for controlling a host write operation of the write data to the memory device in response to the fetched write command and a background operation onto the memory device,
   wherein, when a workload of the background operation is greater than a workload of the host write operation and an available capacity of the buffer is smaller than a threshold capacity, the host interface is further suitable for:
   generating a completion response in response to the write command;
   determining a delay amount of time;
   delaying the completion response by the delay amount of time; and
   providing the host with the delayed completion response,
   wherein, during the delay amount of time, the processor performs the background operation onto the memory device and the host write operation such that the workloads of the processor are reduced, and, after the delay amount of time, a next command from the host is received by the host interface,
   wherein the host interface determines the delay amount of time based on a free buffer size as the available capacity and an estimated-required buffer size, and
   wherein the host interface is further suitable for determining the estimated-required buffer size based on a number of commands received from the host but unfetched, a ratio of write commands among recently fetched commands and a data size of the fetched write command.

2. The controller of claim 1, wherein the host interface comprises:
   a host interface layer (HIL) core suitable for determining the delay amount and generating the completion response; and
   a command state scheduler suitable for delaying the completion response by the delay amount of time, and then providing the host with the delayed completion response.

3. The controller of claim 2, wherein the HIL core is further suitable for:
   receiving the write data associated with the write command from the host, and
   outputting the completion response to the command state scheduler.

4. The controller of claim 1,
   wherein the buffer includes a host write buffer, and
   wherein the host interface is further suitable for determining the free buffer size based on a size of the host write buffer, an allocated buffer size and the estimated-required buffer size.

5. The controller of claim 1, wherein the host interface provides the host with the completion response when the available capacity is equal to or greater than the threshold capacity.

6. The controller of claim 5,
   wherein the buffer includes a host write buffer, and
   wherein the threshold buffer size is determined according to a size of the host write buffer and a data size that can be simultaneously programmed into the memory device.

7. The controller of claim 1,
   wherein the processor is further suitable for setting a background flag by comparing the workload of the background operation with the workload of the host write operation, and
   wherein the host interface is further suitable for determining whether the workload of the background operation is greater than the workload of the host write operation, by referring to the background flag.

8. The controller of claim 7, wherein the processor sets the background flag by comparing a number of valid pages, which are copied from a victim block to a target block during a garbage collection operation, with a number of pages stored in the memory device in response to the write command of the host during the garbage collection operation.

9. An operating method of a controller that controls a memory device, the operating method comprising:
   fetching a write command received from a host;
   storing, in a buffer, write data associated with the write command;
   controlling a host write operation of the write data to the memory device in response to the fetched write command and a background operation onto the memory device;
   generating a completion response in response to the write command;
   determining a delay amount of time when a workload of athe background operation of the is greater than a workload of the host write operation and an available capacity of the buffer is smaller than a threshold capacity;
   delaying the completion response by the delay amount of time;
   providing the host with the delayed completion response; and
   during the delay amount of time, performing the background operation onto the memory device and the host write operation such that the workloads of the processor are reduced, and, after the delay amount of time, a next command from the host is received by the host interface,
   wherein the delay amount of time is determined based on a free buffer size as the available capacity and an estimated-required buffer size, and
   wherein the estimated-required buffer size is determined based on a number of commands received from the host but unfetched, a ratio of the write commands among recently fetched commands and a data size of the fetched write command.

10. The operating method of claim 9,
    further comprising receiving write data associated with the write command from the host,
    wherein the providing is performed after the receiving of the write data.

11. The operating method of claim 9, further comprising determining the free buffer size based on a size of a host write buffer included in the controller, an allocated buffer size and the estimated-required buffer size.

12. The operating method of claim 9, further comprising provides the host with the completion response when the available capacity is equal to or greater than the threshold capacity.

13. The operating method of claim 12, wherein the threshold buffer size is determined according to a size of a host write buffer included in the controller and a data size that can be simultaneously programmed into the memory device.

14. The operating method of claim 9, further comprising:
setting a background flag by comparing the workload of the background operation with the workload of the host write operation; and
determining whether the workload of the background operation is greater than the workload of the host write operation, by referring to the background flag.

15. The operating method of claim 14, wherein the background flag is set by comparing a number of valid pages, which are copied from a victim block to a target block during a garbage collection operation, with a number of pages stored in the memory device in response to the write command of the host during the garbage collection operation.

16. An operating method of a controller, the operating method comprising:
responding to a first write command while buffering first write data into a buffer and controlling a memory device to perform, as well as a background operation, a write operation with second write data buffered in the buffer; and
delaying, when a background operation workload is greater than a write operation workload and an available capacity of the buffer is smaller than a threshold capacity, the responding by a delay amount while controlling the memory device to perform at least the background operation during the delay amount, wherein the available capacity is calculated by equation A:

(Free buffer size)=(host write buffer size)−(alllocated buffer size)+(estimated required buffer size)  [Equation A]

where "Free buffer size" is the available capacity, "host write buffer size" is a total capacity for write data within the buffer, "allocated buffer size" is an allocated capacity of the buffer and "estimated-required buffer size" is an estimated-required capacity of the buffer calculated by equation B:

(Estimated required buffer size)=(# of infetched CMD)×(fetched write CMD ratio)×(data size of fetched CMD)  [Equation B]

where "# of unfetched CMD" is a number of commands to be queued, "fetched write CMD ratio" is a ratio of queued write commands to a predetermined number of queued commands, and "data size of fetched write CMD" is a size of write data of one of the queued write commands, and wherein the delay amount is calculated by equation C:

$$(\text{Delay}) = \frac{(\text{threshold buffer size}) - (\text{free buffer size})}{(\text{threshold buffer size})} \times (\text{estimated required buffer size}) \times C \quad [\text{Equation C}]$$

where "delay" is the delay amount, "threshold buffer size" is the threshold capacity, and "C" is a predetermined constant.

* * * * *